United States Patent Office 3,532,703
Patented Oct. 6, 1970

3,532,703
2,2,5,5-TETRASUBSTITUTED-4-OXOIMIDAZO-LIDINE-1-OXIDES
Keisuke Murayama, Syoji Morimura, Toshimasa Toda, and Tomizi Tsuzi, Tokyo, Japan, assignors to Sankyo Company Limited, Tokyo, Japan
No Drawing. Filed June 15, 1967, Ser. No. 646,197
Claims priority, application Japan, June 15, 1966, 41/38,686
Int. Cl. C07d 49/34
U.S. Cl. 260—294                   6 Claims

ABSTRACT OF THE DISCLOSURE

Novel 2,2,5,5-tetrasubstituted - 4 - oxoimidazolidine-1-oxides which are useful as stabilizers for polyolefins against deterioration resulting from exposure to light. The said imidazolidine-1-oxides are prepared by treating the corresponding 2,2,5,5 - tetrasubstituted - 4 - oxoimidazolidines with a peroxide, preferably in the presence of a catalyst for oxidation, more preferably together with a promoter.

---

This invention relates to a new class of imidazolidine-N-oxides and a process for preparing the same.

More particularly, it relates to the imidazolidine-N-oxides having the formula

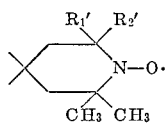

(I)

wherein $R_1$ and $R_2$, which may be the same or different, represent alkyl group or they may be linked together with the carbon atom to which they are attached to form a saturated 5- or 6-membered homocyclic ring which may be substituted with alkyl group or the group of the formula

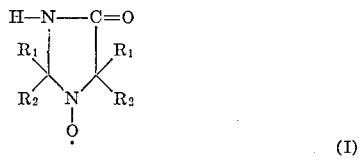

(wherein $R_1'$ and $R_2'$, which may be the same or different, represent alkyl group or they may be linked together with the carbon atom to which they are attached to form a saturated 5- or 6-membered homocyclic ring which may be substituted with alkyl group.)

Also, it relates to a process for the preparation of these imidazolidine-N-oxides having the above Formula I.

The imidazolidine-N-oxides (I) of this invention are novel compounds unknown in the prior art. They exhibit exceptionally high stabilizing effect against photodeterioration of polyolefins including, for example, polyethylene, polypropylene, other polyolefins such as polybutadiene and olefin copolymers such as ethylene-propylene copolymers, styrene-butadiene copolymers and acrylonitrile-butadiene-styrene copolymers. Thus, these novel imidazolidine-N-oxides are useful as light stabilizers for various polyolefins.

Accordingly, it is a principal object of this invention to provide new imidazolidine-N-oxide derivatives (I) which are useful as stabilizers for polyolefins against deterioration resulting from exposure to light. Another object of this invention is to provide a novel and commercially advantageous process for the preparation of the valuable imidazolidine-N-oxides having the above Formula I.

In the above Formula I, each of the $R_1$ and $R_2$ may be illustratively represented by the following groups; methyl, ethyl, n-propyl, isopropyl, n-butyl, isobutyl, hexyl, octyl, decyl and dodecyl. The cyclic groups formed by the $R_1$ and $R_2$ may be illustratively represented by the following groups;

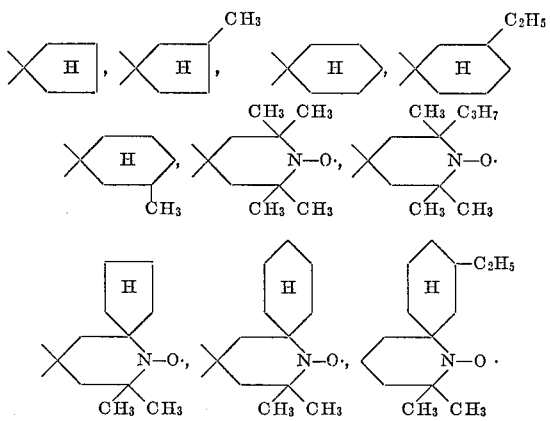

In accordance with this invention, there is provided a novel process for the preparation of the imidazolidine-N-oxide having the above Formula I, which process comprises treating the imidazolidine derivative having the formula

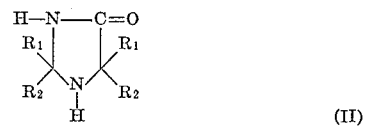

(II)

wherein $R_1$ and $R_2$ are as defined above with a peroxide.

In carrying out the process of this invention, the reaction may be satisfactorily conducted by treating the said imidazolidine derivative (II) with a suitable peroxide. Suitable examples of the peroxide to be employed in this process include hydrogen peroxide, an organic peracid and the like. Suitable examples of the organic peracid are peracetic acid, perbenzoic acid, substituted-perbenzoic acids and the like.

Where hydrogen peroxide is employed as an oxidizing agent in this process, it is preferable to conduct oxidation reaction in the presence of a catalyst for oxidation, more preferably together with a promoter, since the increased yield of the desired product may be obtained. There may be satisfactorily employed any of those catalysts for oxidation and promoters commonly utilized in the art for oxidation, but alkali metal salts of such inorganic acid as tungstic, phosphotungstic and phosphomolybdic acids and vanadium oxides are preferable as a catalyst and ethylenediaminetetraacetic acid as a promoter. In this case, the reaction of this process may also be conducted in the presence of a suitable reaction solvent such as water and inert organic solvents, e.g. methanol, acetic acid, and the like. The reaction temperature and period are not critical, but the reaction is usually conducted at ordinary temperature, and preferably at a higher temperature ranging from about 20° C. to about 50° C. for about 10–30 hours.

Where an organic peracid is employed as an oxidizing agent, the reaction may be conveniently conducted at ordinary temperature, but it may be more preferable to employ any external cooling means to about 0–10° C. during the addition of an organic peracid, since, in this case, the reaction may initially be exothermic. The reaction may also be preferably conducted in the presence of a suitable reaction solvent; for instance, preferable being water, acetic acid, ethyl acetate, methylene chloride and the like for peracetic acid and ether, benzene, chloroform and the like for perbenzoic acid and substituted-perbenzoic acids.

The desired product, i.e. the imidazolidine-N-oxide of the above Formula I may be preferably recovered from the reaction mixture, for instance, by admixing either the crystalline substance collected by filtration, if separated out in situ, or the reaction mixture, if not, with a saturated aqueous solution of a suitable alkali such as hydroxides and carbonates of sodium, potassium, calcium and barium and the like at ordinary temperature for about 1-3 hours, extracting the resulting mixture with a suitable organic solvent such as benzene, ether, methyl ethyl ketone and the like and then removing the solvent by distillation. The crude product thus obtained may be further purified, for instance, by recrystallization from a suitable organic solvent such as methanol, benzene, methyl ethyl ketone and the like, if desired.

The imidazolidine derivatives of the above Formula II which may be employed as a starting material in the process of this invention are novel compounds with exception of cyclohexane - 1 - spiro - 2' - (4' - oxoimidazolidine) - 5' spiro - 1'' - cyclohexane and these novel compounds can be easily obtained by reacting the ketone compounds having the formula

wherein $R_1$ and $R_2$ are as defined above with a suitable ammonium salt and a suitable alkali (or alkaline earth) metal cyanide to form the corresponding aminonitrile compound having the formula

wherein $R_1$ and $R_2$ are as defined above followed by reaction of the latter compound (IV) with a suitable alcoholate or hydroxide of alkali (or alkaline earth) metal, as being illustrated by the following reaction schema.

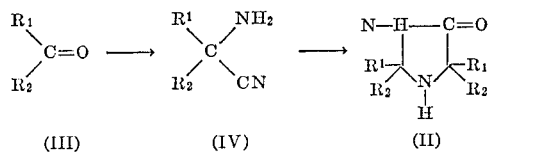

The following examples are given for the purpose of illustrating of this invention, but they should not be construed to be limiting the scope thereof.

EXAMPLE 1

Preparation of cyclohexane-1-spiro-2'-(4'-oxoimidazolidine-1'-oxide)-5'-spiro-1''-cyclohexane To a solution of 2 g. of cyclohexane-1-spiro-2'-(4'-oxoimidazolidine)-5'-spiro-1''-cyclohexane in 15 ml. of acetic acid and 5 ml. of water was added a solution of 0.03 g. of ethylenediaminetetraacetic acid and 0.025 g. of sodium tungstate in 3 ml. of water. To the resulting mixture was then added dropwise 4 ml. of 30% hydrogen peroxide. The resulting mixture was stirred at room temperature for 9 hours. The crystalline substance which separated out was recovered by filtration. To the substance thus obtained was added a saturated aqueous potassium carbonate solution, the resulting mixture was stirred for 3 hours and then the whole mixture was extracted several times with benzene. The combined extracts were washed with water, dried and concentrated to leave a crystalline substance, which was then recrystallized from benzene to give the desired product, melting at 227–228° C.

Analysis.—Calculated for $C_{13}H_{21}O_2N_2$ (percent): C, 65.79; H, 8.92; N, 11.81. Found (percent): C, 66.05; H, 8.93; N, 11.87. Molecular weight: Calculated; 237.31. Found (Osmometer): 240.2.

The electron spin resonance spectrum (in $C_6H_6$) of the imidazolidine-N-oxide thus obtained showed a strong triplet of a hyperfine coupling constant 16.3 oersted, which would be given by the splitting due to the interaction of the unpaired electron spin with nuclear spin of the N atom in the product. This result evidently demonstrates the presence of N-oxide free radical in the product.

EXAMPLE 2

Preparation of 2,2,5,5-tetramethyl-4-oxoimidazolidine-1-oxide

To a solution of 4.0 g. of 2,2,5,5-tetramethyl-4-oxoimidazolidine in 30 ml. of acetic acid was added dropwise at 5–10° C. 25 ml. of a 9% peracetic acid solution in acetic acid with ice-cooling and stirring. The reaction mixture was then stirred at 5–10° C. for 1 hour and successively at ambient temperature for additional 24 hours. Then, the reaction mixture was made alkaline by the addition of a saturated aqueous sodium carbonate solution. The resulting mixture was stirred at ambient temperature for 2 hours, and extracted several times with benzene. The combined extracts were washed with water, dried and then concentrated to leave a crystalline residue, which was then recrystallized from water to give the desired product, melting at 225–226° C.

Analysis.—Calculated for $C_7H_{13}O_2N_2$ (percent): C, 53.48; H, 8.34; N, 17.82. Found (percent): C, 53.43; H, 8.33; N, 17.72.

Following the same procedure as described above except that 4.5 g. of 2,5-dimethyl-2,5-diisobutyl-4-oxoimidazolidine was employed instead of 2,2,5,5-tetramethyl-4-oxoimidazolidine and the recrystallization was conducted from aqueous methanol, there was obtained 2,5-dimethyl-2,5-diisobutyl-4-oxoimidazolidine-1-oxide.

EXAMPLE 3

Preparation of 2,5-dimethyl-2,5-diethyl-4-oxoimidazolidine-1-oxide

Following the same procedure as in the above Example 2 except that 2,5-dimethyl-2,5-diethyl-4-oxoimidazolidine in an equal amount was employed instead of 2,2,5,5-tetramethyl-4-oxoimidazolidine-1-oxide and the recrystallization was conducted from petroleum benzine, there was obtained the desired product, melting at 114–115° C.

Analysis.—Calculated for $C_9H_{17}O_2N_2$ (percent): C, 58.35; H, 9.25; N, 15.12. Found (percent): C, 58.22; H, 9.20; N, 15.09.

EXAMPLE 4

Preparation of 1-methylcyclohexane-2-spiro-2'-(4'-oxoimidazolidine - 1'-oxide)-5'-spiro-2''-(1''-methylcyclohexane)

Following the same procedure as in the above Example 1 except that 1-methylcyclohexane-2-spiro-2'-(4'-oxoimidazolidine) - 5'-spiro-2''-(1''-methylcyclohexane) in an equal amount was employed instead of cyclohexane-1-spiro - 2' - (4'-oxoimidazolidine)-5'-spiro-1''-cyclohexane and the recrystallization was conducted from petroleum benzine, there was obtained the desired product, melting at 174–175° C.

Analysis.—Calculated for $C_{15}H_{23}O_2N_2$ (percent): C, 68.41; H, 8.80; N, 10.64. Found (percent): C, 68.35; H, 8.82; N, 10.70.

EXAMPLE 5

Preparation of (2,2,6,6-tetramethylpiperidine-1-oxide)-4 - spiro-2'-(4'-oxoimidazolidine-1'-oxide)-5'-spiro-4''-(2'',2'',6'',6''-tetramethylpiperidine-1''-oxide)

Following the same procedure as in the above Example 1 except that (2,2,6,6-tetramethylpiperidine-1-oxide)-4-spiro - 2' - (4'-oxoimidazoline)-5'-spiro-4''-(2'',2'',6'',6''-tetramethylpiperidine-1''-oxide) in an equal amount was employed instead of cyclohexane-1-spiro-2'-(4'-oxoimidazolidine)-5'-spiro-1''-cyclohexane and the recrystallization was conducted from a mixture of benzine and petroleum benzine, there was obtained the desired product, melting at 215–217° C.

*Analysis.*—Calculated for $C_{19}H_{33}O_4N_4$ (percent): C, 59.81; H, 8.71; N, 14.69. Found (percent): C, 59.70; H, 8.75; N, 14.71.

What is claimed is:

1. A compound having the formula

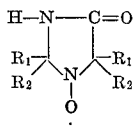

wherein $R_1$ and $R_2$, which may be the same or different, represent alkyl of 1 to 6 carbon atoms or they may be linked together with the carbon atom to which they are attached to form a cyclopentane or cyclohexane ring which may be substituted with methyl or ethyl, or the group of the formula

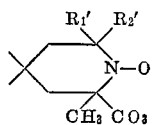

wherein $R_1'$ and $R_2'$, which may be the same or different, represent alkyl of 1 to 3 carbon atoms or they may be linked together with the carbon atom to which they are attached to form a cyclopentane or cyclohexane ring which may be substituted with methyl or ethyl.

2. Cyclohexane - 1 - spiro-2'-(4-oxoimidazolidine-1'-oxide)-5'-spiro-1''-cyclohexane.

3. 2,2,5,5-tetramethyl-4-oxoimidazolidine-1-oxide.

4. 2,5-dimethyl-2,5-diethyl-4-oxoimidazolidine-1-oxide.

5. 1 - methylcyclohexane - 2-spiro-2'-(4'-oxoimidazolidine-1'-oxide)-5'-spiro-2''-(1''-methylcyclohexane).

6. (2,2,6,6 - tetramethylpiperidine-1-oxide)-4-spiro-2'-(4' -oxoimidazolidine-1'-oxide)-5'-spiro-4''-(2'',2'',6'',6''-tetramethylpiperidine-1''-oxide).

References Cited

Lebeder et al, Zhur. Obshchei Khim. 30(5), 1631–5 (1960).

HENRY R. JILES, Primary Examiner

G. T. TODD, Assistant Examiner

U.S. Cl. X.R.

260—45.8, 309.7